Oct. 4, 1966 J. P. BROMBERG 3,277,189
PROPYLENE CHLOROHYDRIN PRODUCTION
Filed March 29, 1963
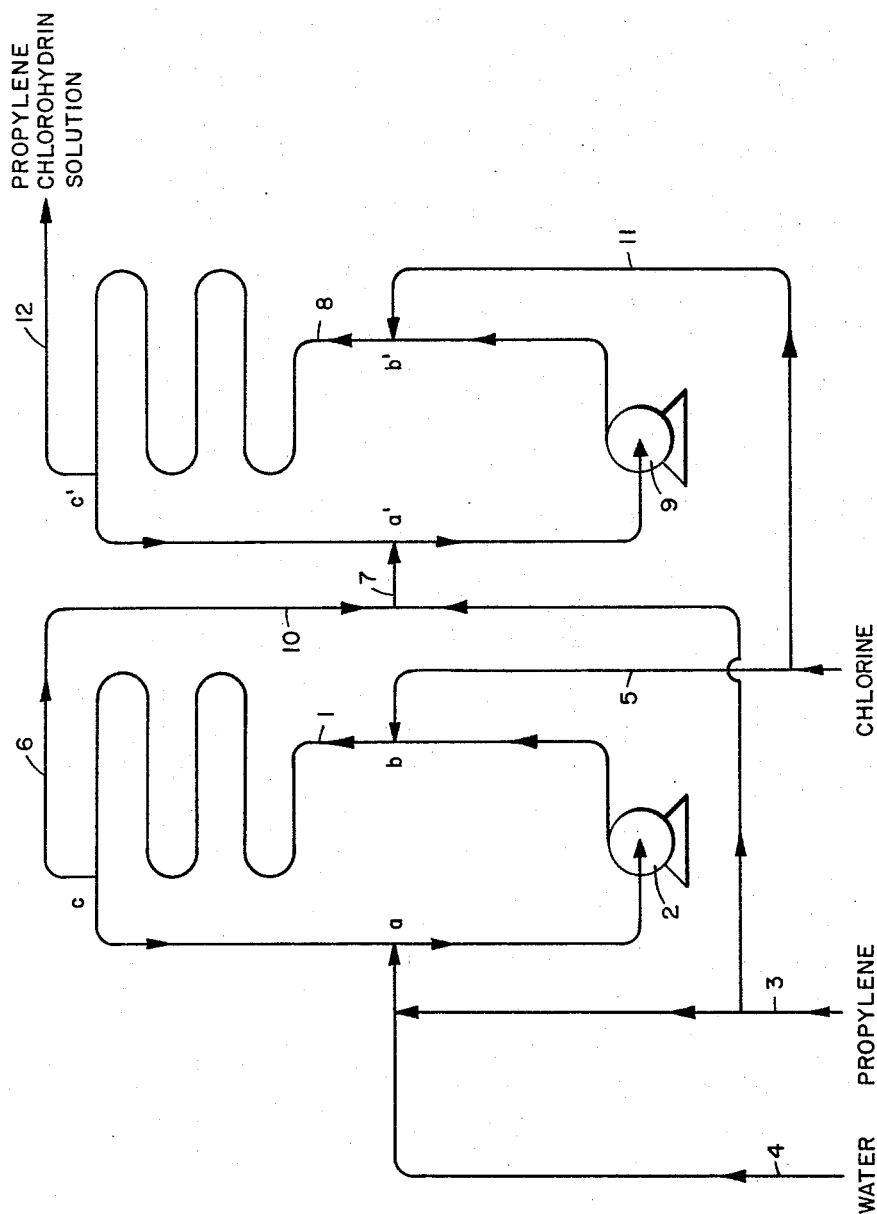
INVENTOR:
JOHAN P. BROMBERG
BY: Millard L. Caldwell
HIS ATTORNEY

United States Patent Office 3,277,189
Patented Oct. 4, 1966

3,277,189
PROPYLENE CHLOROHYDRIN PRODUCTION
Johan P. Bromberg, London, England, assignor to Shell
Oil Company, New York, N.Y., a corporation of Delaware
Filed Mar. 29, 1963, Ser. No. 269,079
Claims priority, application Netherlands, Apr. 2, 1962,
276,687
10 Claims. (Cl. 260—634)

This invention relates to the chlorohydrination of propylene and deals with a new method for carrying out this process continuously so as to produce propylene chlorohydrin in a more efficient and economical manner than has hitherto been possible.

Various processes have been proposed for the preparation of propylene chlorohydrin from propylene, chlorine, and water. The principal reactions involved in these processes are the formation of hypochlorous acid from the chlorine and water and the addition of the hypochlorous acid to the double bond of the propylene. These reactions may be represented by the following equations:

(1) $\quad H_2O + Cl_2 \longrightarrow HOCl + HCl$ (2) $\quad CH_3-CH=CH_2 + HOCl \longrightarrow CH_3-\underset{\underset{}{|}}{\overset{\overset{OH}{|}}{C}H}-\underset{}{\overset{\overset{Cl}{|}}{C}H_2}$ (3) $\quad CH_3-CH=CH_2 + HOCl \longrightarrow CH_3-\underset{\underset{}{|}}{\overset{\overset{Cl}{|}}{C}H}-\underset{}{\overset{\overset{OH}{|}}{C}H_2}$ Unfortunately, these reactions are accompanied by undesirable side reactions, the principal ones being the addition of chlorine to the double bond of the propylene and the formation of ethers, the following by-products being formed:

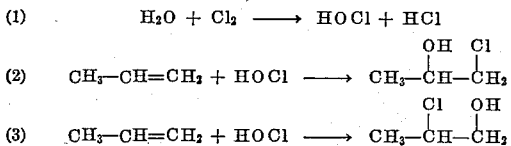

and isomeric ethers.

If no special precautions are taken, 20–30% of the propylene may be consumed by the side reactions. According to the U.K. patent specification 450,372, the addition of chlorine to the double bond of olefins such as ethylene and propylene may be limited considerably by avoiding contact of the olefin with free chlorine in the gaseous phase. The patent specification describes as one way by which the presence of a gaseous phase in the reaction mixture may be avoided, the carrying out of the reaction in a pipe instead of in towers as in the usual mode of operation. The chlorine and the olefin are introduced into the pipe which communicates with a receptacle from which the chlorohydrin solution is recirculated through the pipe. This method is, however, rejected in the U.K. patent specification as being unacceptable on an industrial scale, and it is proposed to carry out the reaction in a circuit comprising more or less distinct zones into which are passed the chlorine and the olefin in volumes respectively adapted to the degree of solubility of these materials in the recirculating liquid. In this manner, it is ensured that the chlorine may first form hypochlorous acid with water before contacting the olefin. According to the U.K. patent specification 738,171, this method is useful for the preparation of ethylene chlorohydrin, but when using higher olefins, such as propylene, the yields do not exceed 70–75%. The U.K. patent specification 738,171 indicates that it is very important to avoid any formation of a separate liquid organic phase mainly consisting of the above-mentioned by-products since side reactions, such as the addition of chlorine to the double bond of the olefin, take place in the said liquid phase. According to the U.K. patent specification 738,171, good results can be obtained by combining the measure proposed in the U.K. patent specification 450,372, i.e., the introduction of the chlorine and the olefin into more or less distinct zones of a reaction circuit, with two other measures comprising the use of an excess of olefin or an olefin diluted with an inert gas, for example, propane and a low chlorine content of the recirculating liquid. The use of excess olefin or dilute olefin makes it essential that a gas stream of unreacted olefin and/or inert gas should be continuously withdrawn from the reactor. Since by-products, such as addition products of the chlorine to the olefin, are entrained by this gas stream, they are continuously withdrawn from the recirculating liquid, and the formation of a liquid organic phase is avoided.

The process of the U.K. patent specification 738,171 has, however, several drawbacks. In the first place, it is inevitable for the economic operation of the said process that the gases withdrawn from the system should be worked up to make them suitable for re-use.

The units for the purification and the compression of the gases are costly and complicated. A further drawback of the process of the U.K. patent specification 738,171 is that a large proportion of the recirculating liquid is always in close contact with a gaseous phase. Since reaction (1) is an equilibrium reaction chlorine, it will continuously escape to the gaseous phase even when measures are taken to ensure that the chlorine, before contacting the olefin, has had an opportunity of forming hypochlorous acid with water. The chlorine immediately reacts in the gaseous phase with the gaseous olefin since it is particularly in the gaseous phase that the addition reaction proceeds very fast. In the process of the U.K. patent specification 738,171, however, the presence of a gas phase must be tolerated in order to counteract the formation of a liquid organic phase which is likewise a drawback.

The present invention provides a continuous process for the preparation of propylene chlorohydrins in which both the formation of a liquid organic phase and of a gaseous phase is avoided. Moreover, this process is so carried out that side reactions in the aqueous phase, such as the formation of ethers containing chlorine, are suppressed. The process consists in continuously adding equimolar quantities of chlorine and propylene together with water to an aqueous solution of the propylene chlorohydrin which is recirculated in a reaction circuit, a portion of the recirculating solution being continuously withdrawn and passed through one or more subsequent reaction circuits to which are added further quantities of propylene and chlorine in an equimolar ratio, a more concentrated chlorohydrin solution recirculating in each circuit than in the preceding circuit and a portion of the solution recirculating in the last circuit being continuously withdrawn as product. In this process it is essential that the added propylene have a degree of purity of at least 95% and that it be added to the circuits in such a quantity that it entirely dissolves in the recirculating liquid.

The reaction circuits here referred to preferably consist of a conduit having its ends connected to a pump which circulates the reaction mixture through the circuit. In such methods of operation the propylene chlorohydrination reaction takes place in a plurality of circuits with progressively increasing concentrations of the propylene chlorohydrin solution in any subsequent circuit so that the average dilution of this chlorohydrin solution is higher than in a process in which the reaction is effected in a single circuit from which the chlorohydrin solution withdrawn has the same concentration as that withdrawn from the last circuit of the system of the invention. As a result of the low average chlorohydrin concentration, the side reactions in the aqueous phase such as the formation of ethers containing chlorine are minimized.

It is known from United States patent specification 2,714,123, to produce dichlorohydrin by adding allyl chloride, chlorine and water, to an aqueous dichlorohydrin solution recirculated in a first circuit, to withdraw a portion of the said recirculating solution continuously, and to pass it together with increments of allyl chloride and chlorine to a second circuit in which a more concentrated dichlorohydrin solution is recirculated than in the first circuit. The said withdrawal of a portion of the recirculating solution and the addition thereof, together with allyl chloride and chlorine, to a subsequent circuit can be repeated, if desired, in one or more subsequent circuits, after which a portion of the solution recirculating in the last circuit is continuously withdrawn.

The process of the present invention for the preparation of propylene chlorohydrins can be carried out in a system which is very much similar to the one shown in FIGURE 3 of U.S. Patent 2,714,123, for the production of dichlorohydrin by chlorohydrination of allyl chloride, although there is a marked difference. When operating according to the process of this United States patent, two liquid phases are present in the reaction mixture, namely an aqueous liquid phase and a liquid organic phase formed in the mixture. The process of the present invention is so carried out that no liquid organic phase at all is formed. It is surprising that despite the fact that, as in the process of the U.K. Patent 738,171, no gas which might entrain by-products formed is passed through the liquid and there are no distinct reaction zones of which the volumes are adapted to the degrees of solubility of the chlorine and the olefin, the formation of a liquid organic phase can be entirely avoided and a propylene chlorohydrin solution having a sufficiently high concentration for use on an industrial scale can nevertheless be removed from the last circuit. It is also surprising that in the process of the invention in which an olefin (propylene) having a much higher volatility and a much lower solubility than allyl chloride is converted to chlorohydrin, there is no formation of gas bubbles in the pumps nor any cavitation therein. In general, it can be stated that it is quite contrary to expectation that in the process of the invention in which various measures which have hitherto been regarded as essential to the suppression of the side reactions, especially in the conversion of olefins having more than 2 carbon atoms, are entirely omitted, very high propylene chlorohydrin yields are nevertheless obtained. The process of the invention is simple and very suitable for use on an industrial scale, especially since residual gas systems required in the known processes can be entirely omitted.

The U.S. patent specification 2,769,845 describes a process for the production of alkylene chlorohydrins from olefins, chlorine, and water in which, as in the process of the invention, various circuits are employed, but the process of this U.S. patent specification differs in many respects from the present process. Thus, for example, the process. Thus, for example, the process is carried out countercurrently, neither avoiding the presence of a gaseous phase nor a liquid organic phase, so that large quantities of by-products are formed.

Propylene suitable for chlorohydrination according to the invention must have a degree of purity of at least 95%, and preferably more than 99%. Very good results are obtained, for example, with a gas mixture 99% of which consists of propylene, the balance being propane and ethylene. The propylene may be added to the circuits in a gaseous form or in a liquid form. The ratio of the number of parts by weight of propylene to the number of parts by weight of water charged per unit of time to the entire system is preferably in the range of from 0.005 to 0.05.

As stated above, the propylene and the chlorine should be added to the circuits in equimolar quantities but minor differences from the equimolar ratios up to approximately 3% excess of olefin have no detrimental effect if the propylene has a degree of purity of at least 99%. An excess of chlorine up to 0.5% is permissible.

The process is carried out in systems comprising 2–6 circuits. In general, the use of more than 6 circuits serves no useful purpose. The water required is preferably added to the first cycle only. The concentration of the propylene chlorohydrin solution progressively increases in subsequent circuits and is highest in the last circuit where it is preferably not higher than 5% by weight. In this case, the concentration in the first circuit is preferably in the range of from 0.9% to 1.8%. When $n$ cycles are used, the concentration in the first cycle is preferably not more than 25% higher than $1/n$ of the concentration in the last circuit. In order to obtain good results, the recirculation rate at which the liquid is pumped through the various circuits should be high. Suitable rates are between 4 and 7 m./sec. The total residence time (this being determined by dividing the capacity of the system by the rate of liquid draw-off per minute from the last circuit) are preferably between 0.5 and 10 minutes, although good results may also be obtained with shorter or longer residence times. Residence times between 1.5 and 2.5 minutes are very suitable.

The process may be carried out at atmospheric or higher pressure, for example, pressures between 1 and 9 atm. Preferably a pressure of at least 3 atm. is used since this increases the quantity of propylene which can be dissolved in the aqueous liquid.

The reaction temperature may vary within wide limits. In general, temperatures in the range of from 0° C. to 90° C. may be used. Preferably, the temperature should not exceed 50° C., since at higher temperatures the solubility of the propylene in the chlorohydrin solution is too low. It should not be lower than 20° C. since otherwise the solubility of the by-products becomes too low. Good results are obtained at temperatures between 30° C. and 40° C.

The process of the invention may be suitably carried out in the system shown diagrammatically in the drawing. In the first circuit consisting of a line 1 of which the ends are connected by a pump 2, a mixture of propylene and water is supplied at $a$ through lines 3 and 4 respectively, and chlorine is added at $b$ by line 5 to a solution of propylene chlorohydrin recycled in the direction shown. At $c$ a portion of the mixture is continuously withdrawn by line 6 and passed by line 7 to a second circuit consisting of a line 8 of which the ends are connected by a pump 9 where it is continuously added at $a'$ to the chlorohydrin solution recirculating in this circuit in the direction shown. Additional propylene supplied by line 10 is introduced with the propylene chlorohydrin solution added by line 6 and a further quantity of chlorine is supplied at $b'$ by line 11. At $c'$ a portion of the reaction mixture is continuously withdrawn by line 12. If desired, the above-described system may be extended in an entirely similar way by one or more circuits in order to ensure that the average dilution of the recirculating chlorohydrin solution is still lower so that side reactions in the aqueous phase are suppressed to a still higher extent.

The conduits 1 and 8 shown in the drawing as connected to the circulating pumps 2 and 9 are indicated as being constructed of ordinary piping of uniform diameter. It will be understood, of course, that such construction is not essential for the successful operation of the new process which can be carried out in other types of apparatus which give analogous results. It may be desirable, for example, to include in the circuits, in some cases, means other than the circulating pumps for promoting mixing of the circulating mixture. Thus, one or more of the conduits may have therein baffles, or impellers, or other mixing devices. It is preferred, however, that the circuit be constructed so the reaction mixture passes therethrough as a forward flowing stream with little or no back mixing.

Most advantageously, the point of introduction of the propylene feed in any circuit is placed sufficiently ahead of the point of chlorine introduction, so that substantially complete solution of the propylene in the aqueous propylene chlorohydrin solution takes place before the mixture reaches the point of chlorine feed. Also, it is desirable that the draw-off points (c and c', for instance) be sufficiently removed from the points of chlorine feed (b and b') so that the chlorohydrination reaction is substantially completed before the solution is withdrawn from the circuit.

The following examples in which the relation of parts by volume to parts by weight is the same as the relation of the litre to the kilogram further illustrate the process of the invention.

*Example I*

Propylene was chlorohydrinated in the system shown in the drawing. Each of the circuits had a capacity of 100 parts by volume. The recirculation rate in the two circuits was 6 m./sec., the temperature 30–40°C. and the pressure 3 atm. The residence time of the reaction mixture in the entire system was 2 minutes. The propylene had a degree of purity of 99.3% and containing 0.65% propane and 0.05% ethylene. The quantities of propylene charged to the first and second circuit were 33 and 23 parts by weight per hour, respectively. The chlorine was added to each circuit in equimolar quantities with respect to the propylene. Water was only charged to the first circuit in a quantity of 6200 parts by volume per hour. The concentration of the chlorohydrin solution in the first circuit was 1.1% and in the second circuit 1.9%. By analysis of the product withdrawn from the second circuit, it was found that 93% of the propylene charged to the system had been converted to propylene chlorohydrin.

*Example II*

In another test carried out in a similar way to that of Example I using a reactor having two circuits and propylene of the same purity, the temperature of the recirculating mixture in the first circuit was 33° to 34° C. and that in the second circuit was 43° to 44° C. The test was carried out at a pressure of 3 atmospheres and total propylene and chlorine feeds of about 10 lb. mols per hour and with concentrations of propylene chlorohydrin in the first and second circuits of 1.5% and 2.6% weight, respectively. The yield based on propylene feed was 93%.

I claim as my invention:

1. A continuous process for the production of propylene chlorohydrin in a plurality of serially connected reaction circuits at about 0° to 90° C. and at least 1 atmosphere pressure using a reaction time of about 0.5 to about 10 minutes which comprises:
    (a) feeding water propylene of at least 95% purity and about an equimolar amount of chlorine, based on the propylene continuously to a circulating stream of aqueous propylene chlorohydrin-containing reaction mixture,
    (b) continuously withdrawing a portion of the recirculating solution corresponding to the weight of material fed thereto and feeding it into a second circulating stream of aqueous propylene chlorohydrin,
    (c) feeding propylene of at least 95% purity and an equimolar amount of chlorine into said second circulating stream while continuously withdrawing a portion of said aqueous propylene chlorohydrin from said second circulating stream in an amount corresponding to the feed thereto,
    (d) controlling the rate of propylene addition to said circulating streams so as to add about 0.005 to about 0.05 part by weight per part of water charged to the entire system whereby the propylene is essentially completely dissolved therein and the chlorohydrination is effected in the essential absence of organic phase in the essentially single phase aqueous reaction mixture.

2. A continuous process for the production of propylene chlorohydrin in a plurality of serially connected reaction circuits at about 0° to 90° C. and at least 1 atmosphere pressure using a reaction time of about 0.5 to about 10 minutes which comprises:
    (a) continuously pumping a stream of aqueous propylene chlorohydrin solution containing essentially only one liquid phase as a circulating stream through a conduit,
    (b) continuously feeding into said circulating stream water, propylene, and about an equal molar amount of chlorine based upon the propylene.
    (c) continuously withdrawing from said circulating stream a portion of the aqueous propylene chlorohydrin solution equivalent in amount to the feed thereto at a point in the circuit sufficiently removed from the point of introduction of the feed to provide a residence time at which essentially complete chlorohydrination of the propylene takes place prior to said withdrawal,
    (d) feeding said withdrawn aqueous propylene chlorohydrin into a similarly operated second circuit in which aqueous propylene chlorohydrin solution is continuously circulated,
    (e) supplying propylene and chlorine without additional water to said second circuit in approximately equimolar proportions and removing from the circulating mixture a portion of the solution containing an equivalent amount of propylene chlorohydrin,
    (f) maintaining the purity of the propylene fed to the circuits at least 95% pure and controlling the rate of propylene feed in relationship to the rate of recirculation of propylene chlorohydrin solution in the circuits so as to add about 0.005 to about 0.05 part by weight of propylene per part of water charged to the entire system whereby the propylene feed streams are essentially completely dissolved in the recirculating liquid.

3. A process for the production of propylene chlorohydrin in accordance with claim 2 wherein the propylene feed to the circuits is more than 99% pure propylene.

4. A process as claimed in claim 3 wherein the concentration of the propylene chlorohydrin solution in the last circuit does not exceed 5%.

5. A process as claimed in claim 3 in which the chlorohydrination is carried out in 2 to 6 reaction circuits with the concentration of the circulating propylene chlorohydrin solution in the first circuit being not more than 25% higher than the concentration in the last circuit divided by the number of circuits used in the process and the circuits following the second are operated in substantially the same way as said second circuit.

6. A process as claimed in claim 5 wherein the concentration of the chlorohydrin solution in the first circuit is in the range of from 0.9 to 1.8%.

7. A process as claimed in claim 3 wherein the rate of recirculation of propylene chlorohydrin solution in the circuits is between 4 and 7 meters per second.

8. A process as claimed in claim 7, wherein the residence time is between 1.5 and 2.5 minutes.

9. A process as claimed in claim 3, wherein the reaction is carried out at a pressure of at least 3 atmospheres.

10. In the production of propylene chlorohydrin by chlorohydrinating propylene in a plurality of serially connected reaction stages at about 0° to 90° C. and at least one atmosphere pressure using a reaction time of about 0.5 to about 10 minutes, the improvement of:
    (a) continuously circulating reaction mixture as a stream flowing at a rate of 4 to 7 meters per second, in each of said reaction stages, (b) continuously feeding water along with propylene and an equimolar amount of chlorine based on the propylene into the first of said reaction stages, (c) supplying propylene and an equimolar amount of chlorine to the following reaction stages without additional water, (d) the propylene feed being propylene of at least 95% purity and supplied to the entire system in the proportion of 0.005 to 0.05 parts by weight per part of water charged to the first reaction stage so the propylene is essentially completely dissolved in the circulating streams of reaction mixture.

(e) the concentration of propylene chlorohydrin being from 0.9 to 1.8% in the first reaction circuit and increasing to not higher than 5% by weight in the last reaction circuit, and (f) the cholorhydrination in each reaction circuit being carried out in the essential absence of organic phase in the essentially single phase aqueous mixture.

References Cited by the Examiner
UNITED STATES PATENTS

| | | | |
|---|---|---|---|
| 2,714,123 | 5/1951 | Johnson | 260—633 |
| 2,769,845 | 4/1953 | Knaus | 260—634 |
| 2,830,095 | 5/1953 | Nicolaisen | 260—634 |

LEON ZITVER, *Primary Examiner.*

M. B. ROBERTO, J. E. EVANS, *Assistant Examiners.*